US011531391B2

(12) United States Patent
Buchanan, IV et al.

(10) Patent No.: US 11,531,391 B2
(45) Date of Patent: Dec. 20, 2022

(54) TENDON DRIVEN EXOSKELETON TIGHTENING MECHANISM

(71) Applicant: CONTACT CONTROL INTERFACES, LLC, West Chester Township, OH (US)

(72) Inventors: Thomas Buchanan, IV, Cincinnati, OH (US); Zachary Schroeder, Liberty Township, OH (US)

(73) Assignee: CONTACT CONTROL INTERFACES, LLC, West Chester Township, OH (US)

( * ) Notice: Subject to any disclaimer, the term of this patent is extended or adjusted under 35 U.S.C. 154(b) by 103 days.

(21) Appl. No.: 17/066,571

(22) Filed: Oct. 9, 2020

(65) Prior Publication Data
US 2022/0113797 A1  Apr. 14, 2022

(51) Int. Cl.
*G06F 3/01* (2006.01)
*B25J 9/00* (2006.01)
*B25J 9/10* (2006.01)

(52) U.S. Cl.
CPC ............ *G06F 3/014* (2013.01); *B25J 9/0006* (2013.01); *B25J 9/104* (2013.01); *G06F 3/016* (2013.01)

(58) Field of Classification Search
CPC ........ G06F 3/014; G06F 3/016; B25J 9/0006; B25J 9/104
USPC .......................................... 340/407.1, 407.2
See application file for complete search history.

(56) References Cited

U.S. PATENT DOCUMENTS

| 10,222,859 B2 | 3/2019 | Rubin et al. |
| 2007/0290988 A1* | 12/2007 | Nogami .................. G06F 3/016 345/156 |
| 2011/0071664 A1* | 3/2011 | Linn ...................... B25J 9/0006 294/25 |
| 2017/0165567 A1* | 6/2017 | Walters ................. A63F 13/285 |
| 2018/0345481 A1 | 12/2018 | Cho et al. |
| 2019/0101981 A1* | 4/2019 | Elias ....................... G06F 3/011 |
| 2019/0101983 A1* | 4/2019 | Cohen .................. A61B 5/6806 |

(Continued)

FOREIGN PATENT DOCUMENTS

| CN | 107373826 A | 11/2017 |
| KR | 200361489 Y1 | 9/2004 |

(Continued)

OTHER PUBLICATIONS

Jadhav, S., Kannanda, V., Kang, B., Tolley, M. T., & Schulze, J. P. (2017). Soft robotic glove for kinesthetic haptic feedback in virtual reality environments. Electronic Imaging, 2017(3), 19-24. doi:10.2352/issn.2470-1173.2017.3.ervr-102.

*Primary Examiner* — Quan Zhen Wang
*Assistant Examiner* — Mancil Littlejohn, Jr.
(74) *Attorney, Agent, or Firm* — Dinsmore & Shohl LLP (57) ABSTRACT

A haptic feedback device to be worn on top of a user's hand comprises a plurality of loops configured to be circumscribed around the user's fingers and thumb, a plurality of anchoring finger caps configured to be circumscribed around extremities of the user's fingers and thumb, at least one haptic actuator housed within each of the anchoring finger caps, and a plurality of tendons coupled to the loops and the anchoring finger caps, the tendons configured to extend along the user's fingers and thumb. The tendons are configured to cause the loops to decrease in diameter to conform to the user's fingers and thumb.

20 Claims, 8 Drawing Sheets

(56) References Cited

U.S. PATENT DOCUMENTS

2019/0204921 A1 7/2019 Goupil et al.
2019/0282426 A1* 9/2019 Weidner ............... A61H 1/0288

FOREIGN PATENT DOCUMENTS

WO 2018212971 A1 11/2018
WO WO-2020146226 A1 * 7/2020 ............. A61F 7/007

* cited by examiner

TENDON DRIVEN EXOSKELETON TIGHTENING MECHANISM

TECHNICAL FIELD

The present specification relates to a haptic feedback device and, more particularly, to a tendon driven exoskeleton tightening mechanism.

BACKGROUND

The virtual reality experience industry has seen many changes over the years. As computing power has expanded, developers of virtual reality or spatial computing experiences have likewise created games and other software that take advantage of these increases in computing power. To this end, game developers have been coding experiences that incorporate sophisticated operations and mathematics to produce a realistic and immersive experience.

How users interact with objects in the virtual reality world is one of the most important factors in the immersive experience. A hand interface technology is an interface technology related to an interaction between the hands of a human and objects in a virtual space. The hand interface technology provides a deeper sense of immersion to a user by complementing visual and audio effects. In particular, a user can feel physically present in the non-physical, virtual world. The addition of the sense of touch, on top of accurately and precisely tracked hand and finger movements, contribute to a user feeling physically present in the virtual world.

One type of hand interface technology is a haptic glove or other wearable haptic device that a user may wear to control a virtual hand or other aspects of a virtual character in a virtual world. The user may then perform physical actions in the real world while wearing the device that may be mimicked by the virtual character in the virtual world. The haptic device may then create a haptic response that can be felt by the wearer of the haptic device based on the interactions that occur in the virtual world.

Such a haptic device is typically is worn around a user's hands and fingers. For example, a haptic device may be a glove that is worn on a user's hand. A haptic glove is typically made of some type of fabric and can be secured to a user's hand and arm by a wrist strap and/or a snug fit. Alternatively, a haptic device may be attached to a user's fingers via loops that circumscribe the user's fingertips and/or other portions of the user's fingers. These loops typically comprise Velcro or plastic loops that must be individually tightened to custom fit the user based on the user's hand size. However, each of these example haptic devices have significant drawbacks.

Wearable haptic gloves generally provide the user the best experience when they fit tightly around the user's hands. However, humans have a wide variety of hand sizes. Thus, it may be desirable to produce haptic gloves in a variety of sizes. However, it can be expensive to manufacture haptic gloves in a wide array of sizes.

In addition, haptic gloves may not be hygienic. As haptic gloves are worn by one or more users, they may acquire bacteria or other unsavory materials over time. Thus, it may be unhealthy to continue to use the same haptic glove over time, especially when it is shared by multiple users. Furthermore, because a haptic glove includes a mix of fabric and electronic hardware, it generally cannot be washed without damaging the electronic hardware. While it is possible to produce washable electronics, it would be quite expensive to produce a washable haptic glove.

A haptic device comprising a loop design may be more hygienic than a haptic glove since a user need only secure loops to their fingers rather than insert their entire hand in the device. However, in order to have an optimal experience, a user must properly secure each loop of the haptic device to their fingers each time the device is used. This can be time consuming and not desirable for the user. Furthermore, if any of the loops are not secure to the proper size, the user's experience may be sub-optimal. Therefore, there is a need for a wearable, loop-based haptic device that automatically adjusts to the proper size when it is worn by a user.

SUMMARY

In one embodiment, a haptic feedback device to be worn on top of a user's hand may include a plurality of loops configured to be circumscribed around the user's fingers and thumb, a plurality of anchoring finger caps configured to be circumscribed around extremities of the user's fingers and thumb, at least one haptic actuator housed within each of the anchoring finger caps, and a plurality of tendons coupled to the loops and the anchoring finger caps. The tendons may be configured to extend along the user's fingers and thumb. The tendons may be configured to cause the loops to decrease in diameter to conform to the user's fingers and thumb.

In another embodiment, a haptic feedback device to be worn on top of a user's hand may include a palm portion to be worn around the user's palm, a plurality of loops configured to be worn around each of the user's fingers, at least one haptic actuator to provide haptic feedback to the user, and a plurality of tendons coupled to the plurality of loops and extending along each of the user's fingers. In a first state, the loops may have a first set of diameters, wherein each diameter of the first set of diameters is greater than a diameter of the user's fingers. In a second state, the plurality of loops may have a second set of diameters, wherein each diameter of the second set of diameters is less than an associated diameter of the first set of diameters. The plurality of tendons may be operable to cause the plurality of loops to transition from the first state to the second state.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
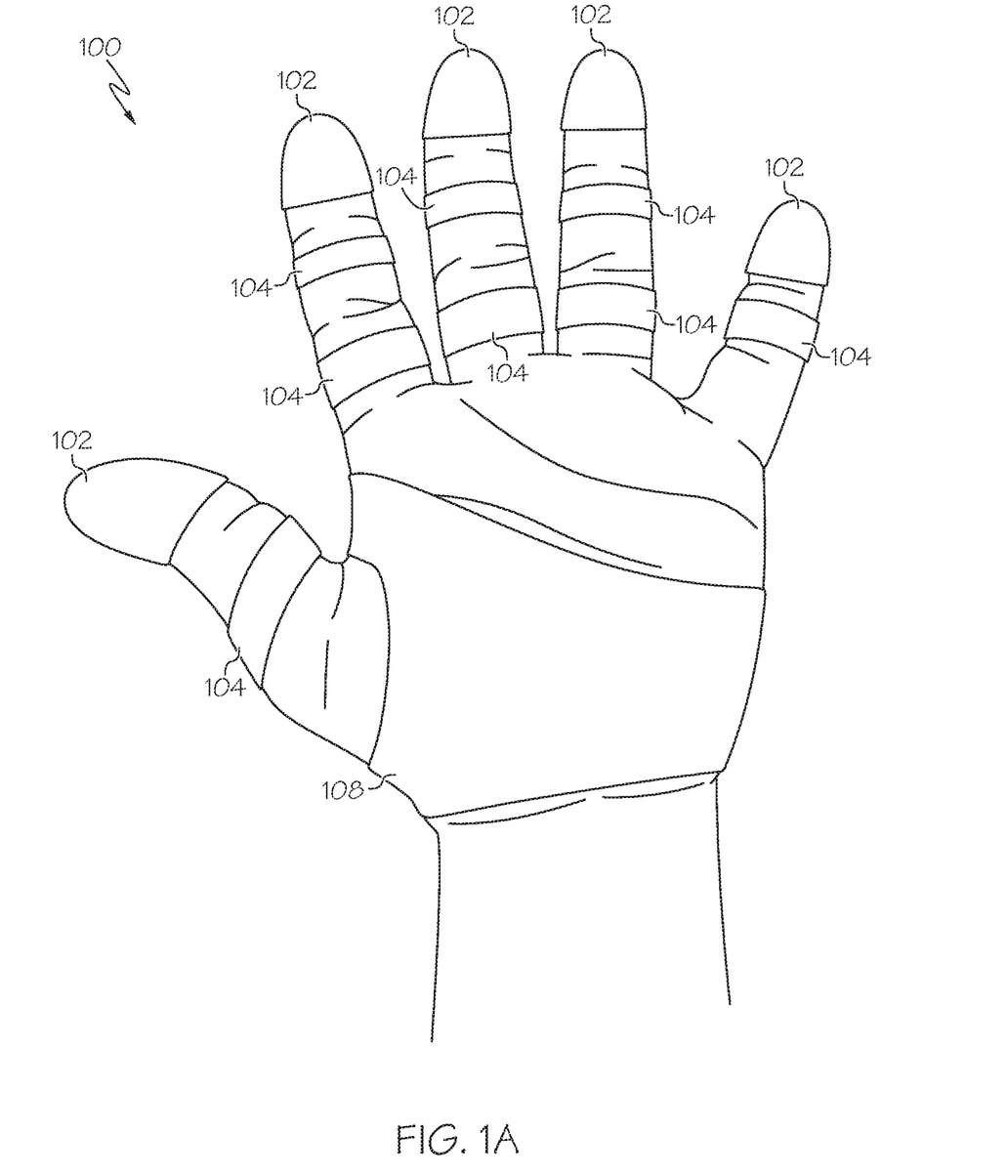
FIG. 1A depicts a palmar portion of an example haptic device.
Figure 1B:
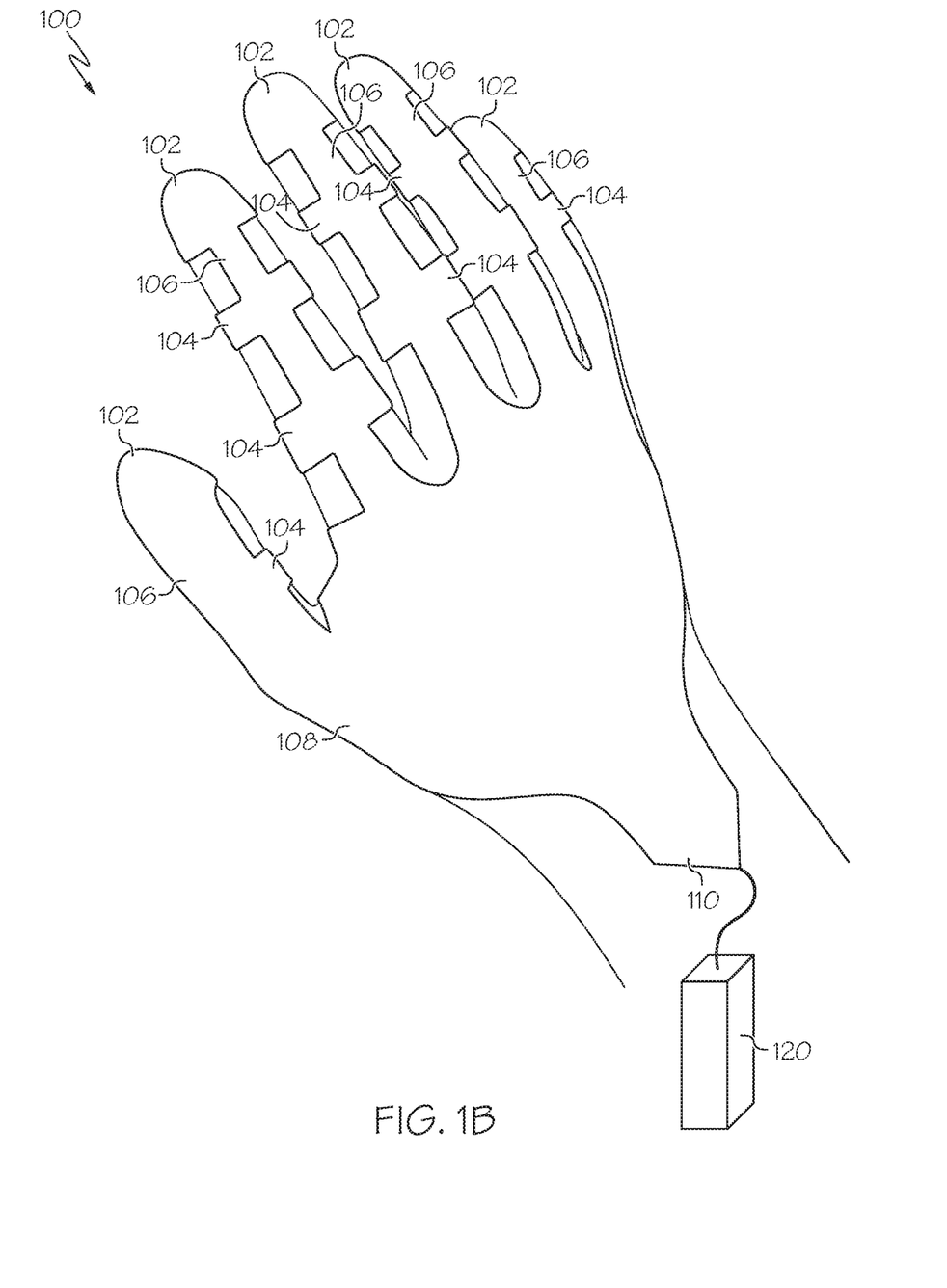
FIG. 1B depicts a dorsal portion of an example haptic device.

Referring now to the figures. FIGS. 1A and 1B depict a haptic device 100 that a user can wear around their hand and fingers. FIG. 1A depicts a palmar portion of the haptic device 100 and a palmar of the user's hand and FIG. 1B depicts a dorsal portion of the haptic device 100 and a dorsal portion of the user's hand.

The haptic device 100 includes a plurality of anchoring finger caps 102 configured to be circumscribed around extremities of a user's fingers and thumb. Each of the anchoring finger caps 102 houses a haptic actuator (not shown). The haptic actuators within the anchoring finger caps 102 may provide haptic feedback to a user when the user wears the haptic device 100. The haptic actuators within the anchoring finger caps 102 may provide a variety of different haptic responses to a user wearing the haptic device 100. For example, the haptic actuators may apply force feedback, vibration, pressure, or temperature variation. In other examples, the haptic actuators may apply other types of haptic feedback to a user wearing the haptic device 100.

The haptic device 100 further comprises a plurality of loops 104 configured to be circumscribed around a user's fingers and thumb. In the illustrated example, the haptic device 100 comprises a single loop 104 around the user's thumb and little finger and two loops 104 around each of the other fingers of the user's hand at different points along those fingers. However, in other examples, the haptic device 100 may comprise any number of loops 104 around each finger of the user.

The haptic device 100 further comprises a plurality of tendons 106 coupled to the loops 104 and the anchoring finger caps 102. The tendons 106 may be connected to the loops 104 at an anchor point on each loop 104. When the haptic device 100 is worn by the user, a tendon 106 extends along the back of each finger of the user, as shown in FIG. 1B. In some examples, the tendon 106 may be embedded within the material of the haptic device 100. As explained in further detail below, the tendons 106 may cause the loops 104 to decrease in diameter to conform to a user's fingers.

The haptic device 100 further comprises a palm portion 108 to be circumscribed around the user's palm. As can be seen in FIG. 1B, the dorsal side of the palm portion 108 is connected to the tendons 106. In embodiments, the palm portion 108 may comprise one or more haptic actuators to provide haptic feedback to the palm of a user when the user is wearing the haptic device 100.

An end portion 110 of the haptic device 100 may be connected to a housing or electronic components to control the operation of the haptic device 100. In the illustrated example, the end portion 110 is connected to the dorsal side of the palm portion 108. In other examples, the end portion 110 may be connected to a palmar side of the palm portion 108 or to other locations on the haptic device 100. In some examples, the end portion 110 may be connected to a cable that is connected to a headset, a gaming system, or other hardware components to control the operation of the haptic device 100. In the illustrated example, the end portion 110 is connected to a cable that is connected to a control device 120, as shown in FIG. 1B, that controls the operation of the haptic device 100. As such, when the user wears the haptic device 100 while playing a virtual reality game or otherwise utilizing the haptic device 100, commands may be received by the haptic device 100 through the end portion 110. These commands may cause the haptic device 100 to create haptic feedback according to interactions occurring in a virtual reality game being played by the user or other experiences where haptic feedback is used.

Figure 2A:
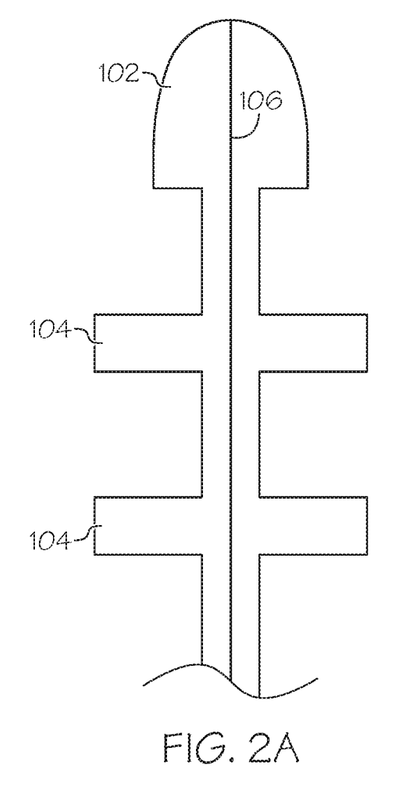
FIG. 2A depicts a portion of the example haptic device in an open state.
Figure 2B:
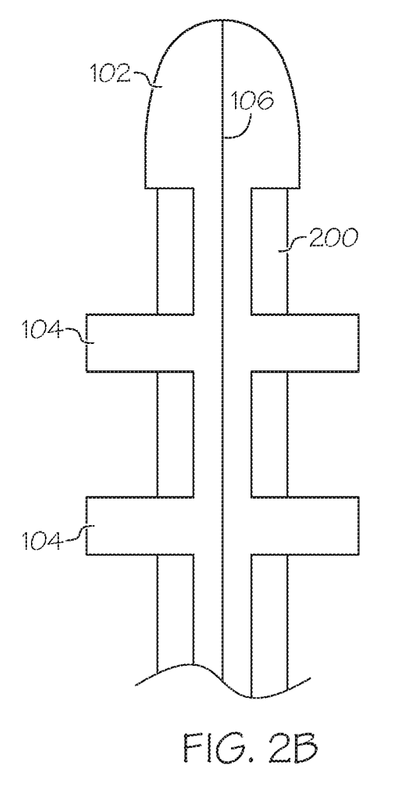
FIG. 2B depicts a portion of the example haptic device in an open state being worn by a user.
Figure 2C:
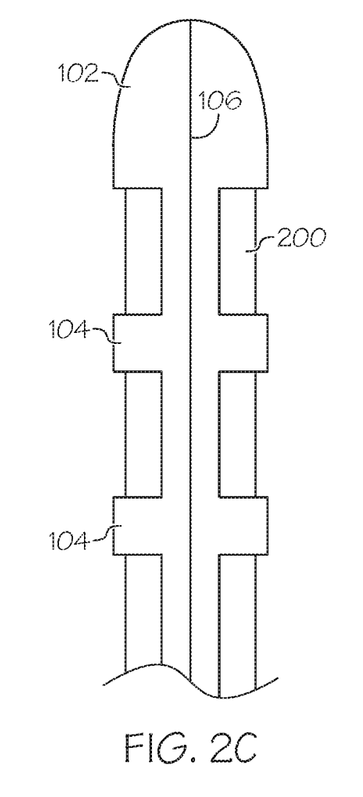
FIG. 2C depicts a portion of the example haptic device in a closed state.

FIGS. 2A, 2B, and 2C show a portion of the haptic device 100. Specifically. FIGS. 2A, 2B, and 2C show a portion of the haptic device 100 that is worn around a single finger of a user. FIG. 2A shows the haptic device 100 in an open state. FIG. 2B shows the haptic device 100 in an open state being worn around a user's finger 200. FIG. 2C shows the haptic device 100 in a closed state being worn around the user's finger 200.

When the haptic device 100 is not being worn by a user, it is in an open state, as shown in FIG. 2A. When the haptic device 100 is in the open state, the diameter of the loops 104 are larger than a typical human finger. Thus, a user can easily place their fingers within the loops 104 when the haptic device 100 is in the open state, as shown in FIG. 2B. After the user places their hand and fingers inside the haptic device 100, the loops 104 are operable to decrease in diameter to tighten such that the loops 104 fit snugly around the user's fingers, as shown in FIG. 2C.

The haptic device 100 may have a padding comprising some type of compliant material positioned between the loops 104 and the user's fingers. Thus, as the loops contract in diameter, the padding may contract as the loops are tightened around the user's fingers. In this way, the haptic device 100 may be comfortably worn by users having any finger size without the loops 104 putting excessive pressure on a user's fingers.

In embodiments, to move the haptic device 100 from the open state to the closed state, the tendons 106 may apply a pulling force to the loops 104 to cause the loops to decrease in diameter. Because the tendons 106 are coupled to the loops 104, pulling on the tendons causes a pulling force to be applied to the loops 104, which causes the loops 104 to decrease in diameter and tighten around a user's fingers.

In some examples, three tendons run along each finger; a first tendon to apply force feedback to the anchoring finger caps 102, and second and third tendons to cause the loops 104 to decrease in diameter. A variety of mechanisms may be used to allow the tendons 106 to apply force feedback to the anchoring finger caps 102 and to cause the loops 104 to decrease in diameter, as discussed below.

Figure 3A:
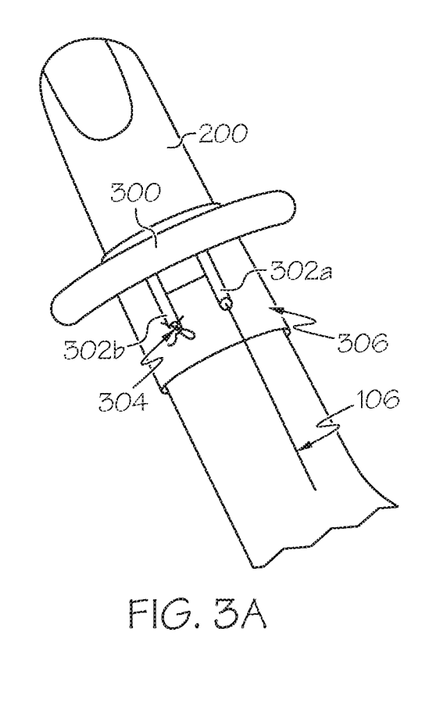
FIG. 3A depicts an example finger loop of the haptic device in an open state.
Figure 3B:
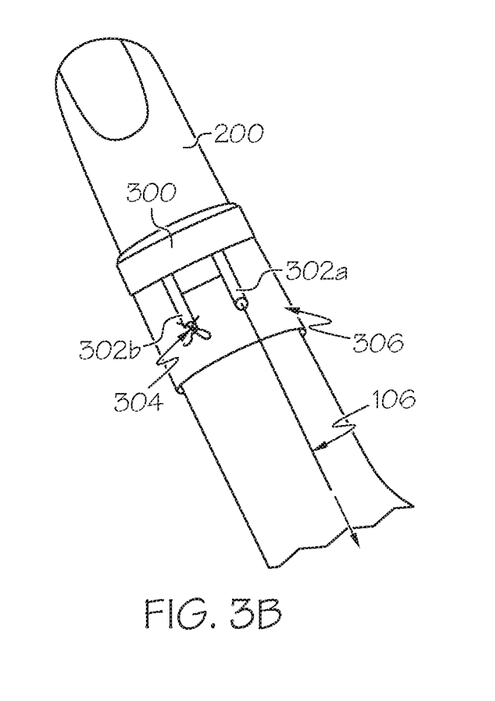
FIG. 3B depicts an example finger loop of the haptic device in a closed state.

FIGS. 3A and 3B show an example finger loop 300 that may be used as a tightening mechanism. In some examples, the finger loop 300 is used in place of each of the loops 104 of the haptic device 100. In other examples, the finger loop 300 is placed around each of the loops 104 of the haptic device 100.

The finger loop 300 includes two routing channels 302a and 302b through which the tendon 106 may be routed. The tendon 106 extends the routing channel 302a an anchor point 304 is positioned at an end of the routing channel 302b. The tendon 106 may be tied off or otherwise secured to the anchor point 304. The finger loop 300 may also include an outer protective surface 306. When a pulling force is applied to the tendon 106 extending from the routing channel 302a (e.g., in direction of arrow 308 in FIG. 3B), a force is applied to the anchor point 304, thereby causing the diameter of the finger loop 300 to contract by tightening the finger loop 300 around a user's finger 200.

Figure 4A:
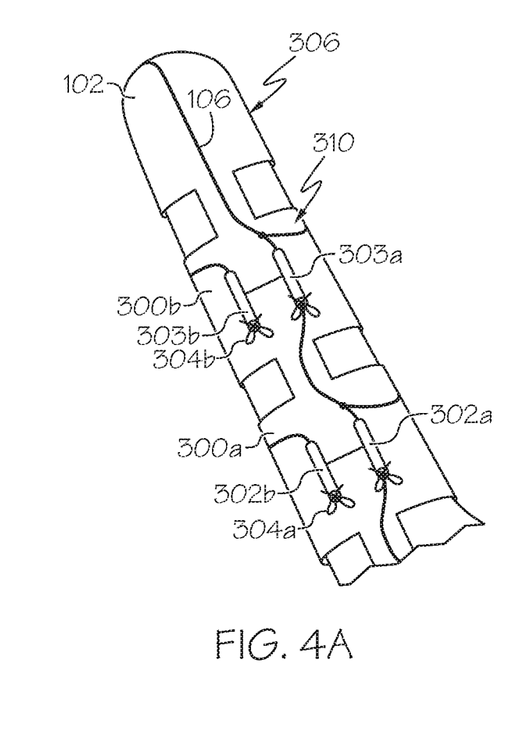
FIG. 4A depicts a portion of an example haptic device utilizing a single tendon.
Figure 4B:
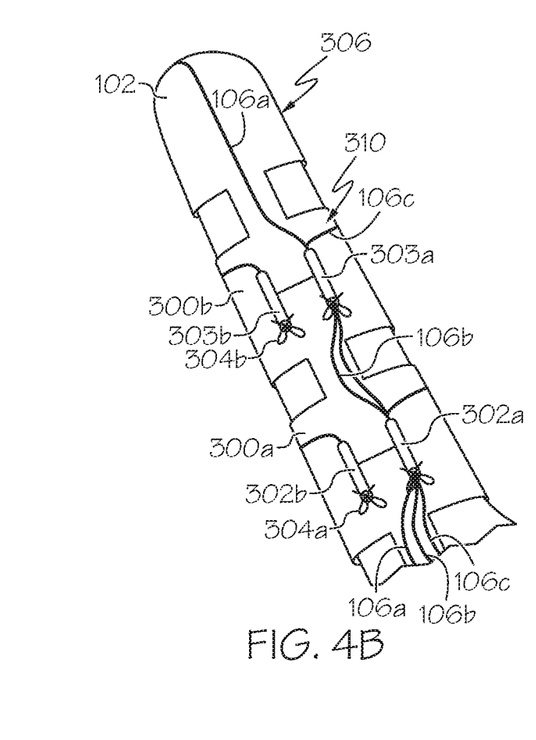
FIG. 4B depicts a portion of an example haptic device utilizing multiple tendons.

FIGS. 4A and 4B show an example of a single finger portion of the haptic device 100 used with the finger loop 300 of FIGS. 3A and 3B. FIG. 4A shows an example where a single tendon 106 is used with two finger loops 300a and 300b. FIG. 4B shows an example where three tendons 106a, 106b, and 106c are used with two finger loops 300a and 300b.

In the example of FIG. 4A, a single tendon 106 is passed through routing channels 302a and 302b of finger loop 300a and routing channels 303a and 303b of finger loop 300b. The tendon 106 is connected to two anchor points 304a and 304b as well as a divergent point 310. The tendon 106 extends from the divergent point 310 around the anchoring finger cap 102. Thus, activation of the control device 120 may cause the tendon 106 to apply a force to the anchoring finger cap 102 and to tighten the finger loops 300a and 300b.

In the example of FIG. 4B, three tendons 106a, 106b, and 106c are used with two finger loops 300a and 300b. The first tendon 106a passes through both finger loops 300a and 300b and extends around the anchoring finger cap 102. The second tendon 106b passes through the routing channels 302a and 302b first finger loop 300a and is connected to anchor point 304a at the end of the routing channel 302b. The third tendon 106c passes through the routing channel 302a of the finger loop 300a, the routing channel 303a of the finger loop 300b and the routing channel 303b of the finger loop 300b and is then connected to anchor point 304b. Thus, activation of the control device 120 may cause the tendon 106a to apply a force to the anchoring finger cap 102. In addition, the tendon 106b may be used to tighten the finger loop 300a, and the tendon 106c may be used to tighten the finger loop 300b.

Figure 5A:
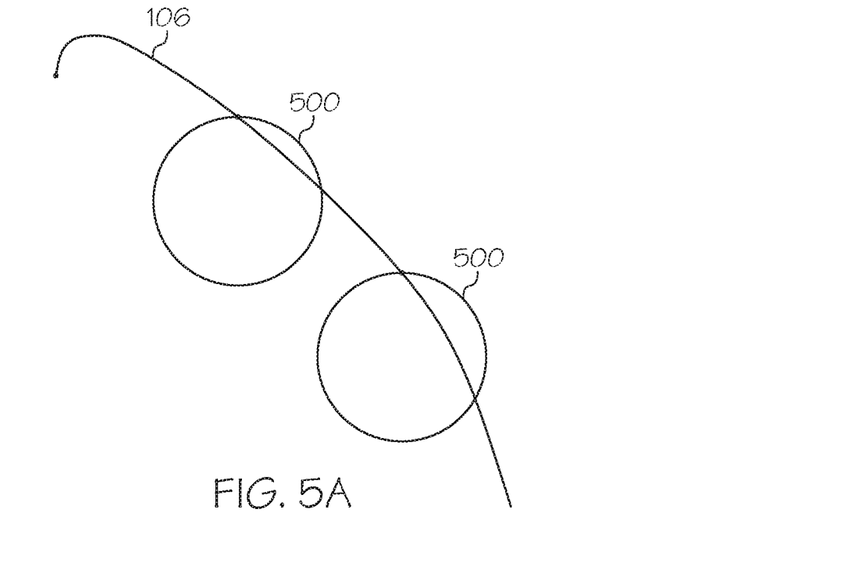
FIG. 5A depicts an example tightening mechanism for the disclosed haptic device in an open state.
Figure 5B:
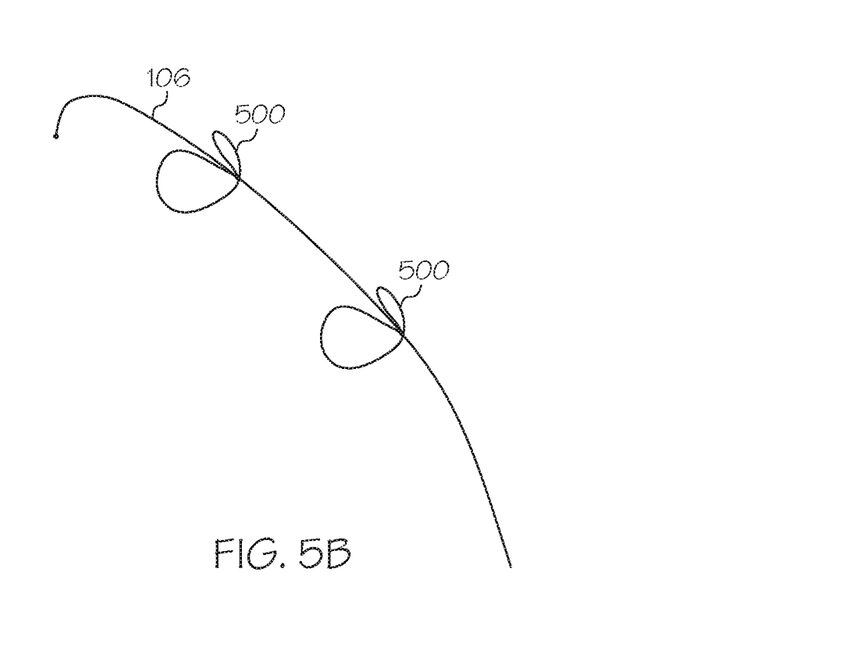
FIG. 5B depicts the example tightening mechanism of FIG. 5A in a closed state.

FIGS. 5A and 5B show another tightening mechanism that may be used with the haptic device 100. In the example of FIGS. 5A and 5B, two additional loops 500 are connected to the tendon 106 at anchor points. These loops 500 may circumscribe the loops 104 of FIGS. 1A and 1B. Thus, when a pulling force is applied to the tendon 106, the loops 500 are tightened, which tightens the loops 104. This causes the loops 500 to transition from an open position, as shown in FIG. 5A, to a closed position, as shown in FIG. 5B.

Figure 6A:
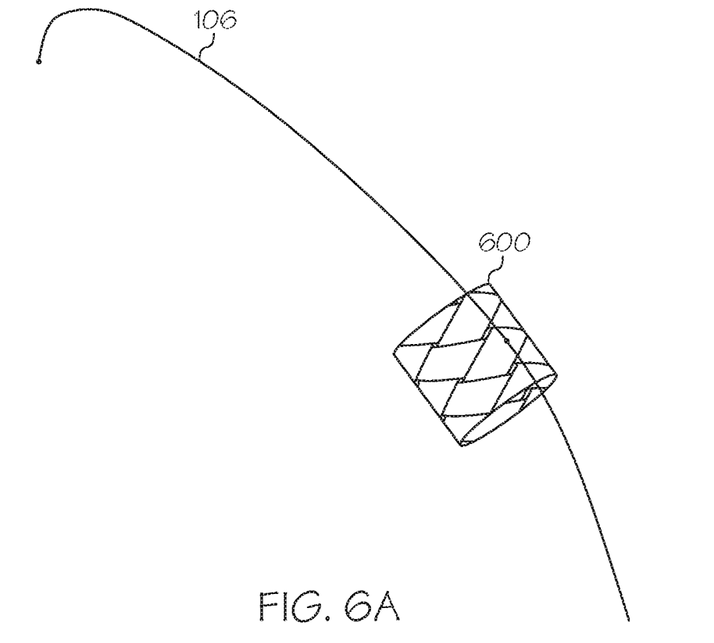
FIG. 6A depicts another example tightening mechanism for the disclosed haptic device in an open state.
Figure 6B:
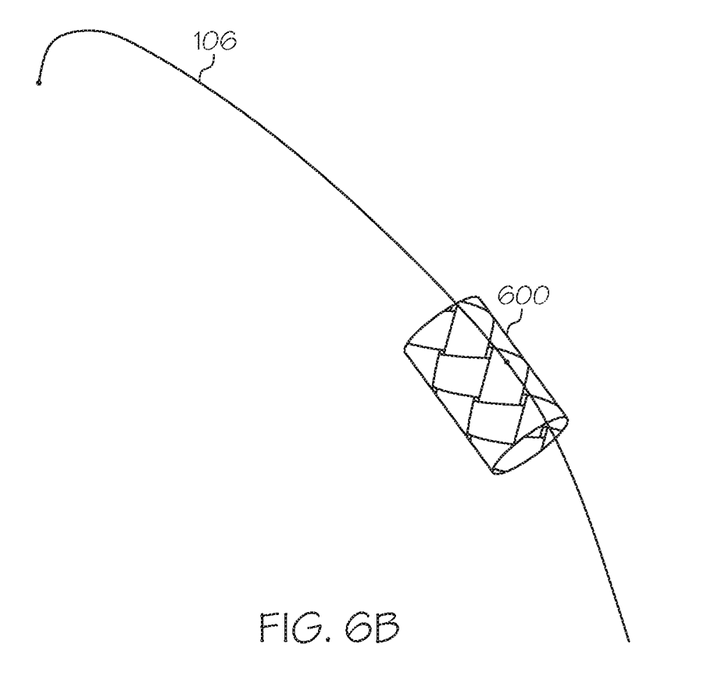
FIG. 6B depicts the example tightening mechanism of FIG. 6A in a closed state.

FIGS. 6A and 6B show another tightening mechanism that may be used with the haptic device 100. In the example of FIGS. 6A and 6B, tightening mechanism 600 is connected to the tendon 106. The tightening mechanism 600 tightens upon opposing force and easily releases upon removal of that force, in a manner similar to a Chinese finger trap. Thus, applying a pulling force to the tendon 106 causes the tightening mechanism 600 to transition from an open position, as shown in FIG. 6A, to a closed position, as shown in FIG. 6B.

Figure 7A:
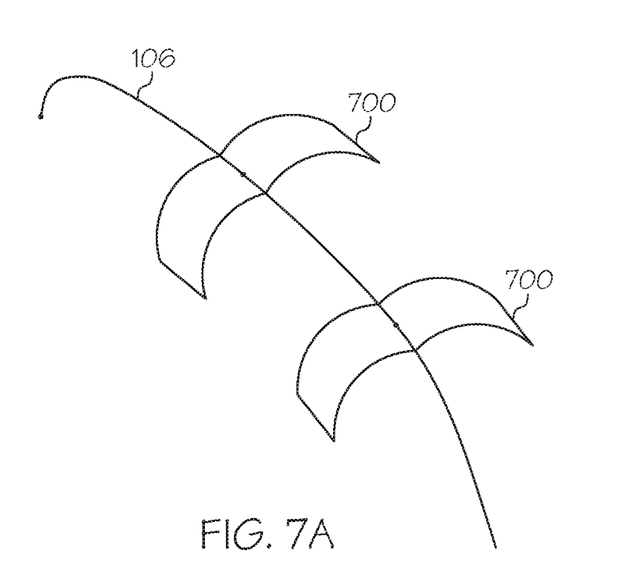
FIG. 7A depicts another example tightening mechanism for the disclosed haptic device in an open state.
Figure 7B:
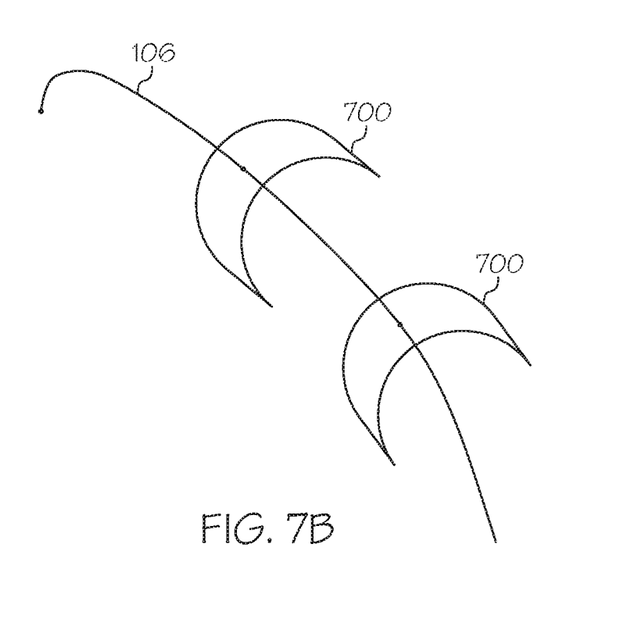
FIG. 7B depicts the example tightening mechanism of FIG. 7A in a closed state.

FIGS. 7A and 7B show another tightening mechanism that may be used with the haptic device 100. In the example of FIGS. 7A and 7B, tightening mechanism 700 is connected to the tendon 106. The tightening mechanism 700 comprises a gripper that closes upon activation of the tendon, thereby tightening the loops 104. That is, applying a pulling force to the tendon 106 causes the tightening mechanism 700 to transition from an open position, as shown in FIG. 7A, to a closed position, as shown in FIG. 7B.

In any of the examples described above, the tendons 106 may be coupled to a control device, such as the control device 120 shown in FIG. 1B, configured to control operation of the tendons 106. Activation of the control device 120 may cause the loops 104 to decrease in diameter, using any of the tightening mechanism described above, and may cause the loops 104 to transition from the open state to the closed state to conform to the user's fingers. Deactivation of the control device 120 may release tension on the loops 104, thereby allowing the diameter of the loops 104 to be easily increased to move from the closed state to the open state such that the user's fingers may be removed from the haptic device 100. The control device 120 may also cause the tendons 106 to apply a haptic force to the anchoring finger caps 102 and/or the palm portion 108. Each haptic actuator of the haptic device 100 may be controlled separately such that different haptic feedback may be applied to different fingers or different portions of a user's hand.

In some examples, when the haptic device 100 is used with a virtual reality game or other haptic experience, there may have an initialization period to tighten the haptic device. For example, during the initialization period, a user may insert their hand into the haptic device 100 while it is in the option position, and the haptic device may then tighten causing the device to transition to the closed position, using any of the mechanisms describe above, such that the haptic device 100 fits snugly around the user's hand. When the user is finished playing the virtual reality game or otherwise using the haptic device, the loops 104 may relax, causing the haptic device to transition from the closed position to the open position, whereby the user can easily remove their hand and fingers from the device.

It should be understood that embodiments described herein are directed to a haptic device that uses a tendon driven exoskeleton tightening mechanism. The haptic device may comprise a plurality of loops configured to be worn around each of the user's fingers, anchoring finger caps to be positioned around a user's finger tips, haptic actuators in the anchoring finger caps to provide haptic feedback to the user, and a plurality of tendons coupled to the loops and anchoring finger caps. The tendons may run along the back of the user's fingers and may be connected to a palm portion that is worn around the user's palm. An end portion of the haptic device may be connected to a housing or other electronic components to control operation of the haptic device.

In an open state, the loops of the haptic device have a diameter larger than a user's fingers such that a user can easily put their hand and fingers into the device. Once the user puts on the haptic device, the tendons may actuate to cause a tightening mechanism to tighten the loops around the user's fingers such that the device fits snugly around the user's hand and fingers in a closed state. The haptic device may then be used with a virtual reality game or other haptic experience and the tendons may be actuated to apply a force to the anchoring finger caps 102 to provide haptic feedback to the user. A control device may control the operation of the tendons. When the user is finished using the haptic device, the control device 120 may deactivate the tension on the tendons, which may cause the loops to relax and expand back to a diameter larger than the user's fingers such that the user may easily take off the device.

The disclosed haptic device allows the palm side of a user's hands and fingers to be exposed. As such, the disclosed device uses a minimal amount of fabric or other material to be used and keeps the user's hands from getting hot and sweating, which improves the hygiene of the device compared to full haptic gloves. In addition, because the loops can expand and contract to a user's actual hand size, a single sized device may be used by users with hands of any size. In addition, if the material used is flexible enough, the haptic device can extend to accommodate fingers of varying lengths without impacting performance or comfort. Furthermore, because a user can easily put on or take off the disclosed device simply by sliding their hands in or out of the device, it is more accessible than other loop-based haptic devices. As such, the disclosed haptic device provides a better experience for users.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A haptic feedback device to be worn on top of a user's hand, the device comprising:
   a plurality of loops configured to be circumscribed around the user's fingers and thumb;
   a plurality of anchoring finger caps configured to be circumscribed around extremities of the user's fingers and thumb;
   at least one haptic actuator housed within each of the anchoring finger caps; and
   a plurality of tendons coupled to the loops and the anchoring finger caps, the tendons configured to extend along the user's fingers and thumb;
   wherein the tendons are configured to cause the loops to decrease in diameter to conform to the user's fingers and thumb;
   wherein the tendons are configured to apply a force to the anchoring finger caps when actuated;
   wherein at least one of the plurality of loops comprises a first routing channel and a second routing channel adjacent to the first routing channel;
   wherein a first tendon of the plurality of tendons is routed through the first routing channel and the second routing channel; and
   wherein the first tendon is secured to an anchor point at a proximal end of the second routing channel, such that when a pulling force is applied to the first tendon in a proximal direction, the diameter of the at least one of the plurality of loops contracts.

2. The haptic feedback device of claim 1, wherein the plurality of tendons are configured to apply a plurality of pulling forces to the plurality of loops to cause the plurality of loops to decrease in diameter.

3. The haptic feedback device of claim 1, further comprising a palm portion configured to be circumscribed around the user's palm.

4. The haptic feedback device of claim 3, wherein the palm portion comprises at least one haptic actuator to provide haptic feedback to the user.

5. The haptic feedback device of claim 1, wherein one or more of the at least one haptic actuator is configured to apply force feedback.

6. The haptic feedback device of claim 1, wherein one or more of the at least one haptic actuator is configured to apply vibration.

7. The haptic feedback device of claim 1, wherein one or more of the at least one haptic actuator is configured to apply pressure.

8. The haptic feedback device of claim 1, wherein one or more of the at least one haptic actuator is configured to apply a temperature variation.

9. The haptic feedback device of claim 1, further comprising a compliant material configured to be positioned between the loops and the user's fingers and thumb when the device is worn by the user.

10. The haptic feedback device of claim 1, wherein the plurality of tendons comprises:
    a plurality of force-applying tendons configured to apply a force to the to the plurality of anchoring finger caps; and
    a plurality of loop-decreasing tendons configured to cause the plurality of loops to decrease in diameter.

11. The haptic feedback device of claim 1, wherein the plurality of loops comprises at least two loops configured to be circumscribed around different points along at least one of the user's fingers.

12. The haptic feedback device of claim 1, further comprising a control device coupled to the plurality of tendons, wherein the control device is configured to control operation of the plurality of tendons.

13. The haptic feedback device of claim 1, wherein the plurality of tendons are configured to cause the plurality of loops to decrease in diameter to conform to the user's fingers and thumb upon activation of the device.

14. The haptic feedback device of claim 1, wherein the plurality of loops are configured to increase in diameter such that the user's fingers and thumb can be removed from the device upon deactivation of the device.

15. A haptic feedback device to be worn on top of a user's hand, comprising:
    a palm portion to be worn around the user's palm;
    a plurality of loops configured to be worn around each of the user's fingers;
    at least one haptic actuator to provide haptic feedback to the user; and
    a plurality of tendons coupled to the plurality of loops and extending along each of the user's fingers;
    wherein, in a first state, the plurality of loops have a first set of diameters, wherein each diameter of the first set of diameters is greater than a diameter of the user's fingers;
    in a second state, the plurality of loops have a second set of diameters, wherein each diameter of the second set of diameters is less than an associated diameter of the first set of diameters;
    wherein the plurality of tendons are operable to cause the plurality of loops to transition from the first state to the second state;
    wherein at least one of the plurality of loops comprises a first routing channel and a second routing channel adjacent to the first routing channel;
    wherein a first tendon of the plurality of tendons is routed through the first routing channel and the second routing channel; and
    wherein the first tendon is secured to an anchor point at a proximal end of the second routing channel, such that when a pulling force is applied to the first tendon in a proximal direction, the diameter of the at least one of the plurality of loops contracts.

16. The haptic feedback device of claim 15, wherein the plurality of tendons are operable to apply a force to an anchoring finger cap that houses the at least one haptic actuator.

17. The haptic feedback device of claim 15, wherein the plurality of tendons are operable to apply a pulling force to the plurality of loops to cause the plurality of loops to transition from the first state to the second state.

18. The haptic feedback device of claim 15, further comprising a plurality of anchoring finger caps configured to be circumscribed around extremities of the user's fingers and thumb,
wherein at least one haptic actuator is housed within each of the plurality of anchoring finger caps; and
wherein the plurality of tendons are operable to apply a force to the plurality of anchoring finger caps when actuated.

19. The haptic feedback device of claim 15, further comprising a plurality of haptic actuators, wherein at least one of the plurality of haptic actuators is configured to apply haptic feedback to each of the user's fingers.

20. The haptic feedback device of claim 15, wherein the plurality of tendons comprise:
a first set of tendons operable to apply a force to an anchoring finger cap that houses the at least one haptic actuator; and
a second set of tendons operable to cause the plurality of loops to transition from the first state to the second state.

* * * * *